US011481983B2

(12) United States Patent
Zavesky et al.

(10) Patent No.: US 11,481,983 B2
(45) Date of Patent: Oct. 25, 2022

(54) TIME SHIFTING EXTENDED REALITY MEDIA

(71) Applicants: AT&T Intellectual Property I, L.P., Atlanta, GA (US); AT&T Mobility II LLC, Atlanta, GA (US)

(72) Inventors: Eric Zavesky, Austin, TX (US); John Oetting, Zionsville, PA (US); James Pratt, Round Rock, TX (US); Terrel Lecesne, Round Rock, TX (US); Jason Decuir, Cedar Park, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/105,463

(22) Filed: Nov. 25, 2020

(65) Prior Publication Data

US 2022/0165037 A1    May 26, 2022

(51) Int. Cl.
*G06T 19/00* (2011.01)
*H04N 5/232* (2006.01)
*H04N 21/81* (2011.01)
*G06F 3/16* (2006.01)

(52) U.S. Cl.
CPC ............ *G06T 19/006* (2013.01); *G06F 3/167* (2013.01); *H04N 5/232* (2013.01); *H04N 21/816* (2013.01)

(58) Field of Classification Search
CPC ....... G06T 19/006; G06F 3/167; H04N 5/232; H04N 21/816

USPC ........................................................ 345/633
See application file for complete search history.

(56) References Cited

U.S. PATENT DOCUMENTS

| 2009/0119704 | A1* | 5/2009  | Dimitrova  | H04N 21/4325 |
|              |     |         |            | 725/38       |
| 2009/0144312 | A1* | 6/2009  | Patel      | G06F 3/167   |
| 2014/0013228 | A1* | 1/2014  | Hutten     | G06F 3/04815 |
|              |     |         |            | 715/720      |
| 2016/0093108 | A1* | 3/2016  | Mao        | A63F 13/825  |
|              |     |         |            | 345/633      |
| 2016/0260253 | A1* | 9/2016  | Reddy      | G06T 7/33    |
| 2017/0345215 | A1* | 11/2017 | Khedkar    | G06F 3/0487  |
| 2022/0028122 | A1  | 1/2022  | Oetting et al. |          |

* cited by examiner

*Primary Examiner* — Hai Tao Sun (57) ABSTRACT

In one example, a method includes presenting an extended reality (XR) experience to a plurality of user devices, wherein the presenting includes presenting a time control along with an XR stream, receiving a first signal from a first user device of the plurality of user devices via the time control, wherein the first signal indicates that a user of the first user device wishes to shift the XR stream to a first point in time that is different from a time that is currently being rendered in the XR stream, and presenting a personal XR environment to the first user device in response to the first signal, wherein the personal XR environment presents the first point in time in the XR stream to the first user device without changing a time point of the XR stream that is currently being presented to other user devices of the plurality of user devices.

20 Claims, 3 Drawing Sheets

TIME SHIFTING EXTENDED REALITY MEDIA

The present disclosure relates generally to extended reality (XR) media, and relates more particularly to devices, non-transitory computer-readable media, and methods for time shifting extended reality media.

BACKGROUND

Extended reality (XR) is an umbrella term that encompasses various types of immersive technology in which the real-world environment is enhanced or augmented with virtual, computer-generated objects. For instance, technologies such as virtual reality (VR), augmented reality (AR), and mixed reality (MR) all fall within the scope of XR. XR technologies may be used to enhance entertainment experiences (e.g., gaming, movies, and the like), educational and/or professional development (e.g., training simulations, virtual meetings, and the like), and travel (e.g., virtual or guided tours of museums and historic sites, and the like).

SUMMARY

In one example, a method performed by a processing system including at least one processor includes presenting an extended reality experience to a plurality of user devices, wherein the presenting includes presenting a time control along with an extended reality stream, receiving a first signal from a first user device of the plurality of user devices via the time control, wherein the first signal indicates that a user of the first user device wishes to shift the extended reality stream to a first point in time that is different from a time that is currently being rendered in the extended reality stream, and presenting a personal extended reality environment to the first user device in response to the first signal, wherein the personal extended reality environment presents the first point in time in the extended reality stream to the first user device without changing a time point of the extended reality stream that is currently being presented to other user devices of the plurality of user devices.

In another example, a non-transitory computer-readable medium stores instructions which, when executed by a processing system, cause the processing system to perform operations. The operations include presenting a time control along with an extended reality stream, receiving a first signal from a first user device of the plurality of user devices via the time control, wherein the first signal indicates that a user of the first user device wishes to shift the extended reality stream to a first point in time that is different from a time that is currently being rendered in the extended reality stream, and presenting a personal extended reality environment to the first user device in response to the first signal, wherein the personal extended reality environment presents the first point in time in the extended reality stream to the first user device without changing a time point of the extended reality stream that is currently being presented to other user devices of the plurality of user devices.

In another example, a device includes a processor and a computer-readable medium storing instructions which, when executed by the processor, cause the processor to perform operations. The operations include presenting a time control along with an extended reality stream, receiving a first signal from a first user device of the plurality of user devices via the time control, wherein the first signal indicates that a user of the first user device wishes to shift the extended reality stream to a first point in time that is different from a time that is currently being rendered in the extended reality stream, and presenting a personal extended reality environment to the first user device in response to the first signal, wherein the personal extended reality environment presents the first point in time in the extended reality stream to the first user device without changing a time point of the extended reality stream that is currently being presented to other user devices of the plurality of user devices.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure enhances XR media by enabling time shifting with the XR media. As discussed above, XR technologies such as virtual VR, AR, and MR may be used to enhance entertainment experiences (e.g., gaming, movies, and the like), educational and/or professional development (e.g., training simulations, virtual meetings, and the like), and travel (e.g., virtual or guided tours of museums and historic sites, and the like). XR information can be presented in multiple sensory modalities, including the visual, auditory, haptic, somatosensory, and olfactory modalities. As such, XR can be used to enhance a user's enjoyment of a media by making the media experience more immersive.

Some XR media streams allow users to join an XR experience that is already in progress. For instance, a user may join a multi-player video game that other users have already been playing for an hour, or may arrive late to a virtual museum tour. Although the user may be able to join the XR stream mid-way through the XR experience, the user is typically unable to access the portions of the XR experience that occurred before the user joined. Thus, the user may miss out on part of the XR experience. In some cases, this may lead to confusion or disorientation on the part of the user. For instance, the portions of the XR experience that the user missed may have been critical to understanding the later portions of the XR experience that the user is now present for. Moreover, the users who are already present in the XR experience may not notice that a new user has joined the XR experience, which may make it difficult for the joining user to fully participate in the XR experience.

Examples of the present disclosure provide a way for users of XR experiences to time shift through the XR experience. More particularly, a user who has joined an XR experience may be able to move backward through an XR stream to experience portions of the XR stream that occurred before the user joined. The user may also be able to move forward through the XR stream up to a current time point in the XR stream. Where multiple users are participating in the same XR experience, a personal XR environment may be provided for a user who wishes to move forward or backward in the XR stream, so that the user can time shift through the XR experience on demand, without affecting other users' experiences. For instance, a user who has just joined an in-progress XR experience may move backward through the XR stream to see what he missed, while the other users may continue to experience the current XR stream. Thus, examples of the present disclosure provide a temporary XR space for local time control.

The personal XR environment may also be used to acclimate joining users to an in-progress XR experience and/or to ease a user's exit from the XR experience. This may smooth the integration of the new user into the XR experience. Further examples of the present disclosure may provide a notification to existing users of an XR experience when a new user joins the XR experience and/or enters a personal XR environment in order to time shift through the XR stream.

Within the context of a present disclosure, an "XR experience" is understood to be a presentation of XR media. For instance, an XR experience could comprise a multi-player XR game, a virtual tour (e.g., of a museum, historical site, real estate, or the like), a training simulation (e.g., for an emergency responder, a vehicle operator, or the like), a meeting (e.g., for professional or educational purposes), an immersive film presentation, or another type of experience. An "XR stream" refers to a persistent record or file containing the data corresponding to the XR experience (e.g., real and virtual video, audio, and other sensory modality files that, when presented to a user, create the XR experience). The XR stream may comprise a prerecorded stream or a dynamic stream that is recorded in real time as the XR experience progresses.

Figure 1:
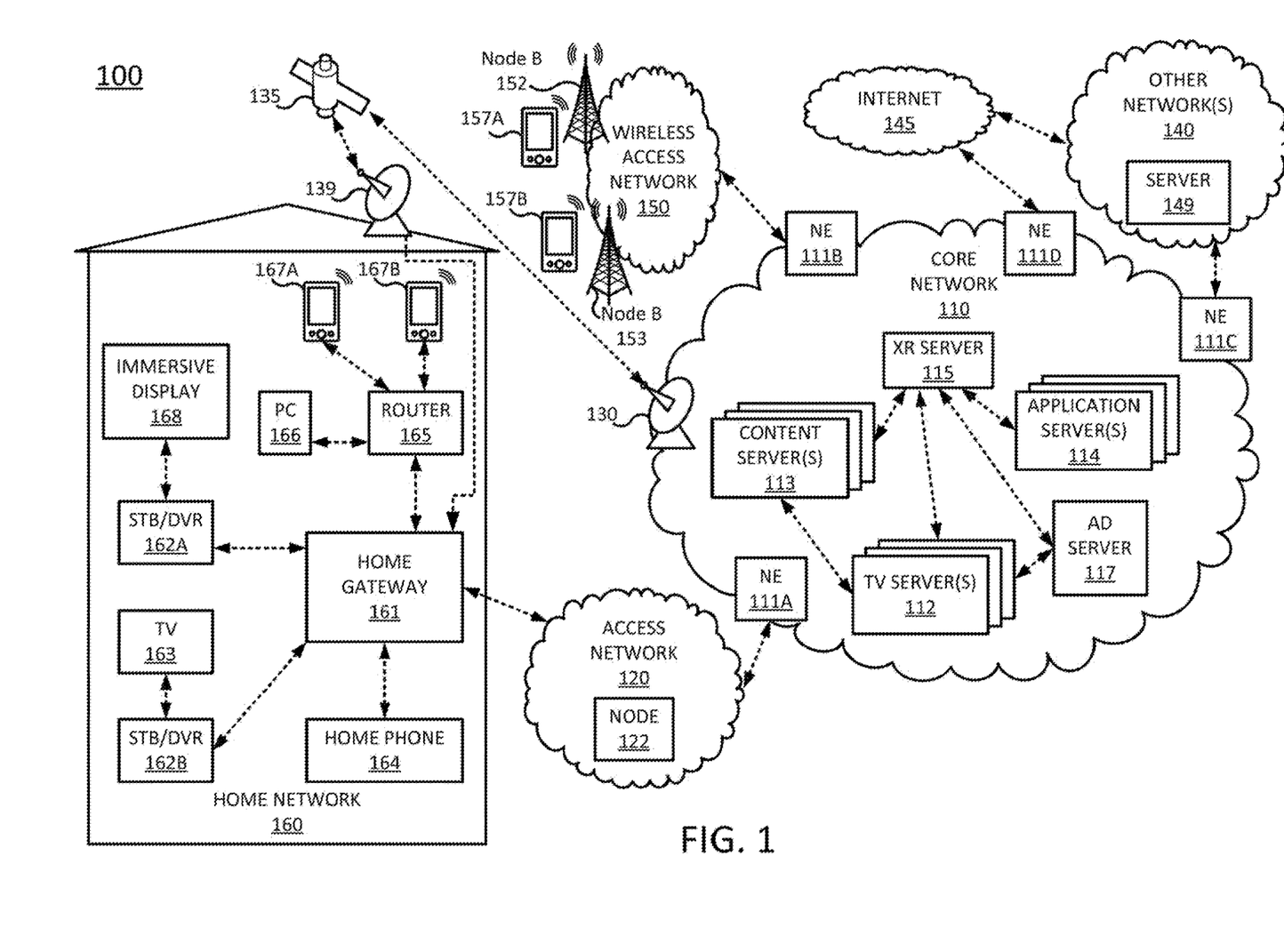
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163, home phone 164, router 165, personal computer (PC) 166, immersive display 168, and so forth, with one another and with various other devices via a core network 110, a wireless access network 150 (e.g., a cellular network), an access network 120, other networks 140 and/or the Internet 145. In some examples, not all of the mobile devices and home network devices will be utilized in presentation of an XR experience with time shifting capabilities. For instance, in some examples, presentation of XR media may make use of the home network devices (e.g., immersive display 168 and/or STB/DVR 162A), and may potentially also make use of any co-located mobile devices (e.g., mobile devices 167A and 167B), but may not make use of any mobile devices that are not co-located with the home network devices (e.g., mobile devices 157A and 157B).

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology including "fifth generation" (5G) and further generations. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB).

In one example, each of mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming console, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server (AS) 117, and an extended reality (XR) server 115 (e.g., an application server). For ease of illustration, various additional elements of core network 110 are omitted from FIG. 1.

In one example, XR server 115 may generate computer-generated content (e.g., digital overlays which may be combined with a live media including images of a "real world" environment, or entirely digital environments) to produce an extended reality experience. For instance, where the computer-generated content comprises a digital overlay, the computer-generated content may include renderings of virtual objects that do not exist in the real world environment, such as graphics, text, audio clips, and the like. However, when the computer-generated content is synchronized with the live footage of the "real world" environment on an immersive display (e.g., over a live video stream on a television or on a live view through a head mounted display), it may appear to a user that the virtual objects are present in the "real world" environment.

Where the computer-generated content is an entirely digital environment, the entirely digital environment may appear to the user as a simulated environment in which the user may interact with objects and/or other users. In one example, the extended reality experience for which the computer-generated content is rendered is a multi-user experience, such as a multi-player or cooperative video game, an immersive film presentation, a training simulation, a virtual tour or meeting, and/or other types of experience. Collectively, the computer-generated content and any real-world content with which the computer-generated content is combined may comprise an XR stream, e.g., a persistent record or file containing the data corresponding to the XR experience.

In one example the XR server 115 may collect data provided by users of the network 100. The collected data may be provided directly to the XR server 115 by the users, e.g., via the mobile devices 157A, 157B, 167A, and 167B, the PC 166, the home phone 164, the TV 163, and/or the immersive display 168. Alternatively, the data may be retrieved from network storage, e.g., application servers 114, by the XR server 115. For instance the collected data may comprise user profiles maintained by a network service (e.g., an Internet service provider, a streaming media service, a gaming subscription, etc.), portions of social media profiles maintained by a social media web site (e.g., a social networking site, a blogging site, a photo-sharing site, etc.). The data may indicate information about the users, such as the users' virtual or real identities, avatars for use in the XR experience, and the like. The XR server 115 may also have access to third party data sources (e.g., server 149 in other network 140), where the third party data sources may store the user data.

In a further example, the XR server 115 may generate a temporary, personal XR environment for a user, where the personal XR environment may be used for one or more of a plurality of purposes without disrupting the experiences of other users in a multi-user XR experience. For instance, in one example, the personal XR environment may be used to acclimate a new user who is joining an in-progress XR experience by providing a space in which the new user might review a summary of any of the XR experience that the new user missed (e.g., notable events, other users who are currently present in the XR experience, etc.). In another example, the personal XR environment could similarly be used to ease a user's exit from an XR reality experience (e.g., by providing a summary of the events that the user participated in, information about the real world environment into which the user is exiting, etc.). In yet another example, the personal XR environment may be used to provide a user with a space in which the user may freely explore or shift through the XR stream (e.g., moving backward to a previous time in the XR stream, forward to a later time in the XR stream, etc.). In each case, the personal XR environment provides a space for a user to freely explore and acclimate without affecting what other users see or experience. Thus, the personal XR environment may help to catch late joining users up to speed and ease the late joining users' integration into the XR experience.

The XR server 115 may interact with television servers 112, content servers 113, and/or advertising server 117, to select which video programs, or other content and advertisements, if any, to include in an XR experience. For instance, the content servers 113 may store scheduled television broadcast content for a number of television channels, video-on-demand programming, local programming content, gaming content, and so forth. Alternatively, or in addition, content providers may stream various contents to the core network for distribution to various subscribers, e.g., for live content, such as news programming, sporting events, and the like. In one example, advertising server 117 stores a number of advertisements that can be selected for presentation to users, e.g., in the home network 160 and at other downstream viewing locations. For example, advertisers may upload various advertising content to the core network 110 to be distributed to various users. Any of the content stored by the television servers 112, content servers 113, and/or advertising server 117 may be used to generate computer-generated content which, when presented alone or in combination with pre-recorded or real-world content or footage, produces an XR experience.

Figure 3:
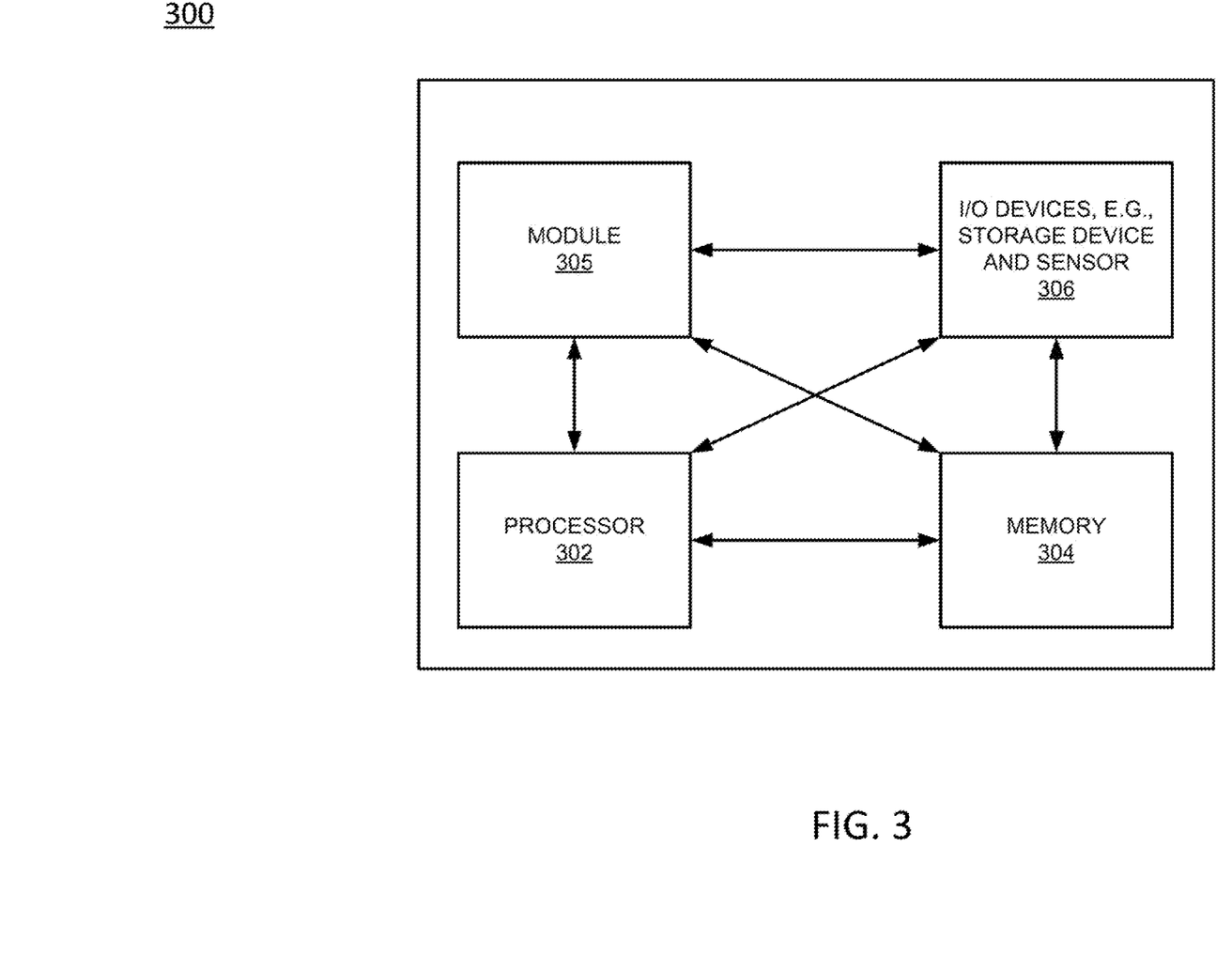
FIG. 3 depicts a high-level block diagram of a computing device specifically programmed to perform the functions described herein.

In one example, any or all of the television servers 112, content servers 113, application servers 114, XR server 115, and advertising server 117 may comprise a computing system, such as computing system 300 depicted in FIG. 3.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163 and/or immersive display 168 for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A and 167B, and so forth. In one example, router 165 may further communicate with TV (broadly a display) 163 and/or immersive display 168, e.g., where one or both of the television and the immersive display incorporate "smart" features. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. For example, one or both of the STB/DVR 162A and STB/DVR 162B may host an operating system for presenting a user interface via TVs 163 and/or immersive display 168, respectively. In one example, the user interface may be controlled by a user via a remote control or other control devices which are capable of providing input signals to a STB/DVR. For example, mobile device 167A and/or mobile device 167B may be equipped with an application to send control signals to STB/DVR 162A and/or STB/DVR 162B via an infrared transmitter or transceiver, a transceiver for IEEE 802.11 based communications (e.g., "Wi-Fi"), IEEE 802.15 based communications (e.g., "Bluetooth", "ZigBee", etc.), and so forth, where STB/DVR 162A and/or STB/DVR 162B are similarly equipped to receive such a signal. Although STB/DVR 162A and STB/DVR 162B are illustrated and described as integrated devices with both STB and DVR functions, in other, further, and different examples, STB/DVR 162A and/or STB/DVR 162B may comprise separate STB and DVR components.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
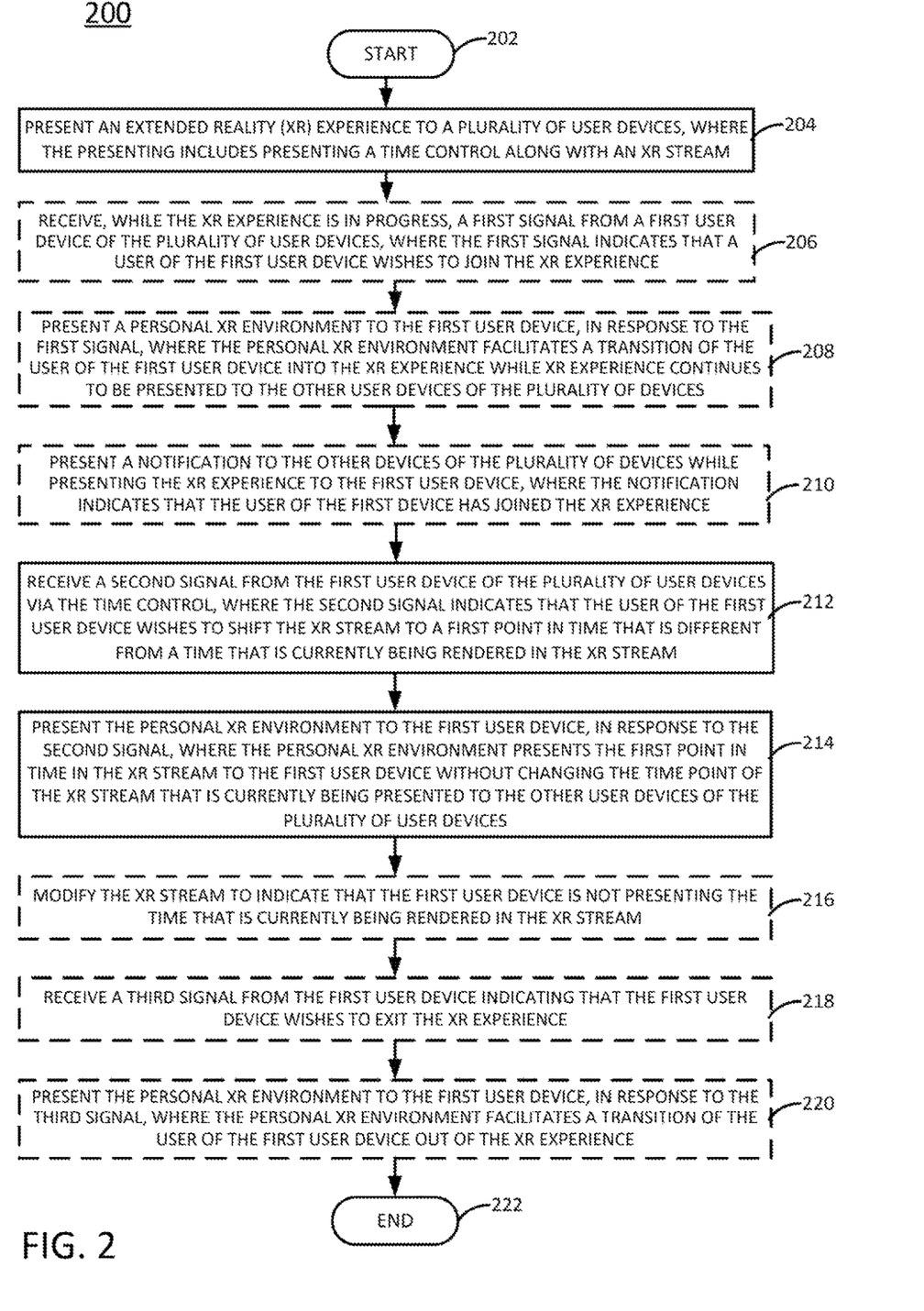
FIG. 2 illustrates a flowchart of a method for presenting an extended reality experience with time shifting capabilities, in accordance with the present disclosure.

To further aid in understanding the present disclosure, FIG. 2 illustrates a flowchart of a method 200 for presenting an XR experience with time shifting capabilities, in accordance with the present disclosure. In one example, the method 200 may be performed by an XR server that is configured to generate computer-generated content that may be blended or synchronized with a "real world" environment to produce an extended reality experience, such as the XR server 115 illustrated in FIG. 1. However, in other examples, the method 200 may be performed by another device, such as the processor 302 of the system 300 illustrated in FIG. 3.

The method 200 begins in step 202. In step 204, the processing system may present an extended reality (XR) experience to a plurality of user devices, where the presenting includes presenting a time control along with an XR stream. In one example, the XR stream may comprise a virtual overlay that each user device of the plurality of user devices renders for superimposition over a respective view of the real world. In another example, the XR stream may comprise an entirely virtual environment that each user device renders for presentation in place of a respective view of the real world.

As discussed above, the XR experience may comprise a multi-player video game, a virtual tour, a meeting, an immersive film, or another type of XR experience. The XR stream, as discussed above, comprises a persistent record of the data corresponding to the XR experience. In one example, the processing system may begin recording and storing the XR stream as soon as the XR experience begins and may save the XR stream for at least some period of time after all of the users of the user devices have completed or exited the XR experience. In one example, the plurality of user devices may include one or more of: an immersive display, a mobile phone, a computing device, or any other device that is capable of rendering an XR environment.

The time control comprises a control that allows a user device to move backward and forward in the XR stream, on demand. For instance, if a user uses the user device to join the XR experience when the XR experience is already in progress (e.g., join a game after the users of the rest of the user devices have been playing for several minutes or hours, join a virtual tour that is already in progress, etc.), the user device may be able to move backward in time (e.g., rewind) in the XR stream to see what happened earlier in the XR experience.

The user device may also move forward in time (e.g., fast forward) in the XR stream. If the XR stream is a pre-recorded stream, then the user device may be able to move forward in time anywhere in the XR stream (e.g., may skip ahead directly to a desired portion of the XR stream). If the XR stream is not a pre-recorded XR stream or is a real-time stream, then the user device may be able to move forward in time up to the current time (e.g., after moving backward to experience an earlier part of the XR stream, the user device may move forward to catch back up to the current time). It should be noted that even users who have not joined the XR experience late may still wish to move backward and/or forward in the XR stream. For instance, a user may need to refresh his memory about something that happened or something that was said earlier in the XR experience, or may simply wish to revisit an earlier event in the XR experience that was particularly enjoyable or informative (e.g., reviewing an earlier disclosed clue or reviewing an earlier action taken by a character in the XR experience).

In one example, the copy of the XR stream may include markers to indicate where certain notable events occurred in the XR experience. The markers may serve as bookmarks that allow user devices to move directly to specific points in time in the XR stream, rather than having to search through the entire XR stream to find the events. For instance, if the XR experience comprises a multi-player battle game, then a marker in the corresponding XR stream might designate a specific battle that the users participated in or specific points in the specific battle where specific objectives were achieved. If the XR experience is a virtual museum tour, a marker in the corresponding XR stream might designate a specific exhibit in the museum. In some examples, a marker may designate a synchronization point for all user devices (e.g., all user devices must jump to the marker at a specific time) or a mandatory event that all user devices must render (e.g., a game tutorial that users must review before playing an XR game).

In one example, the time control may be presented as a graphical element that can be manipulated by a user of a user device to control the progress of the XR stream on the user device. For instance, in one example, the graphical element comprises a clock, where the user can adjust the hands on the clock or adjust the number displayed on the clock to indicate a specific time point in the XR stream. In another example, the graphical element comprises one or more thumbnail images extracted from corresponding time points in the XR stream. In another example, the graphical element comprises a slider that the user can move backward or forward to indicate a magnitude and direction of movement through the XR stream (e.g., ten minutes backward, 2 minutes forward, etc.).

In further examples, however, the time control may comprise a non-graphical control. For instance, the time control could be a voice operable control that responds to verbal commands from a user of a user device (e.g., "go back five minutes," "move forward at double speed," etc.). In another example, the time control could monitor user gestures for gestures that are mapped to specific actions (e.g., moving the user's hand to the left indicates moving backward, moving the user's hand to the right indicates moving forward, holding the user's hand palm forward indicates pausing, etc.).

In optional step 206 (illustrated in phantom), the processing system may receive, while the XR experience is in progress, a first signal from a first user device of the plurality of user devices, where the first signal indicates that a user of the first user device wishes to join the XR experience. For instance, although the XR experience is already in progress, the user of the first user device may still wish to join late.

In optional step 208 (illustrated in phantom), the processing system may present a personal XR environment to the first user device, in response to the first signal, where the personal XR environment facilitates a transition of the user of the first user device into the XR experience while the XR experience continues to be presented to the other user devices of the plurality of devices. In other words, the personal XR environment is presented to the first user device concurrently with the XR experience being presented to the other user devices.

As discussed above, the personal XR environment may facilitate a transition of the user of the first user device into the XR experience. For instance, as discussed above, the user may be seeking to join an XR experience that is already in progress; as such, the user would have missed out on any portion of the XR experience that occurred prior to the user joining. Thus, in one example, the personal XR environment may provide information about the portion of the XR experience that the user of the first user device missed (e.g., a recap or summary of events that have occurred, an indication of how long the XR experience has been presented, the real or virtual identities of users who are currently participating in the XR experience, and/or other information). Thus, the personal XR environment may be considered a virtual "green room," where the user of the first user device can acclimate to the XR experience and be "caught up to speed" without disrupting the experiences of other users.

In optional step 210 (illustrated in phantom), the processing system may present a notification to the other devices of the plurality of devices while presenting the XR experience (e.g., at the time point in the XR experience that is currently being rendered) to the first user device, where the notification indicates that the user of the first device has joined the XR experience. In one example, the notification may comprise an instruction that causes a user device to present at least one of: a visual notification, an audible notification, and a tactile notification. For instance, a visual notification might comprise a ticker, an icon, or the like that may be presented on a display of a user device that indicates that the user of the first user device has just joined. An audible notification might comprise a beep, an announcement (e.g., synthesized speech), or the like that may be presented via a speaker of a user device that indicates that the user of the first user device has just joined. A tactile notification might comprise a rumble, a shake, or the like that may be presented via a haptic feedback mechanism of a user device that indicates that the user of the first user device has just joined.

In step 212, the processing system may receive a second signal from the first user device of the plurality of user devices via the time control, where the second signal indicates that the user of the first user device wishes to shift the XR stream to a first point in time that is different from a time that is currently being rendered in the XR stream (e.g., such that the first user device presents the first point in time, rather than the current time). For instance, the user of the first user device may wish to shift backward to an earlier time point in the XR stream and manipulate the time control, described above, to indicate the desire to shift backward and/or by how much the user wishes to shift backward (e.g., "go back ten minutes" or "go back to Event X"). In another example, specific markers may be automatically created by the processing system for significant events within the XR stream. In one example of an immersive film presentation, the processing system may create markers at specific scenes, specific actor appearances, or specific song inclusions, all detected by an automated recognition system, that are presented to the first user for jumping to these instances in the XR stream.

In step 214, the processing system may present the personal XR environment to the first user device, in response to the second signal, where the personal XR environment presents the first point in time in the XR stream to the first user device without changing the time point of the XR stream that is currently being presented to the other user devices of the plurality of user devices. In other words, the personal XR environment is only presented to the first user device concurrently with the current XR stream being presented to the other user devices (e.g., as in step 208). In another example, a user of a second user device may request to shift the XR stream ahead to a later point in time. For instance, the user of the second user device may want to skip over a certain part of the XR stream, or skip ahead to a well-known portion of the XR stream (e.g., the performance of a popular song). Notification of the shift for the second user device could be provided in real time to the first user device.

In optional step 216 (illustrated in phantom), the processing system may modify the XR stream to indicate that the first user device is not presenting the time that is currently being rendered in the XR stream (or, in other words, to indicate that the user of the first user device is not "present" in the time that is currently being rendered in the XR stream). For instance, a visual modification to the XR stream might comprise blurring, fading, or graying out an avatar or other representations of the user of the first user device in the XR stream to indicate that the user is not "present" in the time that is currently being rendered. In another example, the avatar or other representations may be replaced with a placeholder or icon that specifically indicates that the user is not present in the time that is currently being rendered. In one example, the processing system "moves" the first user device to a personal XR environment at a different time instance in the XR stream, but a visual rendering of the first user device's last-attended instance in time in the XR stream (e.g., "the present" or "real time") may be visualized (e.g., as a picture in a picture) for the user of the first user device. In one example, the visualization assumes a scene-level (e.g., zoomed out) third person perspective rendering of the last-attended instance in time. In another example, activation of the user of the first user's device avatar, the visualization of the last-attended instance in time, or other visual modifications may be temporary and triggered by a specific event in either time instance (last-attended or current) within the XR stream. For example, no avatar or picture in picture display may be presented until a second user is "attacked" by a virtual monster in an XR game.

In another example, an audio modification to the XR stream might comprise presenting the voice of the user of the first user device as a voiceover, rather than coming from the user's avatar. Alternatively, an audio modification might include presenting the voice of the user of the first user device at a lower volume or with some added audio effect (e.g., an echo, reverb, or other effects). In another example, interactive conversations that are happening in real time between a first user and a second user may be created and facilitated by the processing system. In one example, in response to the first user shifting to a personal XR environment, a second user may speak, gesture, or type, "When are we going to dinner?" Although the first user and the second user are in different personal experiences within the XR stream, (the time order may not be relevant), the first user may be presented with an audio message, a visible avatar speaking, a text message, or some other indications that the conversation is live and not part of the shifted XR stream. In one example, this conversation between the first user and the second user may also become a specific marker in the XR stream at the respective time instances of the first user and the second user. In another example, the conversation may be marked as ephemeral and/or confidential, and the addition of the conversation to the XR stream may be suppressed.

In optional step 218 (illustrated in phantom), the processing system may receive a third signal from the first user device indicating that the first user device wishes to exit the XR experience. In one example, the XR experience may still be in progress (i.e., the first user device is requesting to exit before the XR experience has been completed). In another example, however, the XR experience may be coming to a planned end when the third signal is received (e.g., the XR experience may have been configured to last for a predefined period of time, until the users complete a predefined set of tasks, or the like).

In optional step 220 (illustrated in phantom), the processing system may present the personal XR environment to the first user device, in response to the third signal, where the personal XR environment facilitates a transition of the user of the first user device out of the XR experience. For instance, the personal XR environment may present the user with a summary of the user's activities in the XR experience, give the user an opportunity to remotely save a portion of the XR experience or receive further information or communications relating to the XR experience, give the user an opportunity to "bookmark" their place in the XR experience to return later, or the like.

Where the third signal is received while the XR experience is still in progress, the processing system may continue to present the XR experience to the other user devices of the plurality of user devices while presenting the personal XR environment to the first user device. In other words, the personal XR environment is presented to the first user device concurrently with the XR experience being presented to the other user devices.

However, where the third signal is received along with signals from the other user devices (e.g., at a time where the XR experience is planned to end or upon users of the plurality of devices agreeing to end the XR experience), the processing system may present the personal XR environment to all of the user devices, in order to synchronize the plurality of user devices prior to ending the XR experience. This may allow all of the users of the plurality of user devices to share a common end to the XR experience.

The method 200 may end in step 222.

Thus, the method 200 may allow users who join XR experiences "late" to experience portions of the XR experience that the users may have missed (e.g., by moving backward in the XR stream), without disrupting the experiences of other users who may not have missed anything. The method 200 may also allow users, where available, to skip portions of an XR experience (e.g., to move forward in the XR stream), also without disrupting the experiences of other users.

In some examples, the XR experience may be configured, prior to presentation (and in response to user-selected options), to enable or disable the features described above. For instance, users of the XR experience may agree, before beginning the XR experience, whether or not to allow other users to join after the XR experience begins, leave before the XR experience ends, or shift in time through the XR stream while the XR experience is in progress. In further examples, the users may agree on specific events within the XR stream that may be bookmarked to allow users to revisit (i.e., where users may not be able to shift in time through the XR stream to events or times that are not bookmarked).

In a further example still, the processing system may automatically determine whether to enable or disable the features described above. For instance, the processing system may monitor the XR experience and may determine whether certain features would enhance or detract from the XR experience based on changes in the XR environment. As an example, during a virtual conference or meeting, the processing may determine that users should be allowed to join the XR experience late, but should not be able to move backward or forward through the XR stream. In further examples, the processing system may adapt the manner in which objects, avatars, or cameras move in the XR experience in response to a user's movement.

Examples of the present disclosure may therefore prove beneficial in various fields of use. In a simple example, a user could be walking around with a camera (e.g., filming a popular tourist destination) and streaming to the user's friends or family. Examples of the present disclosure would allow those friends and family to see any portion of the stream that they may have missed.

In another example, a tour (e.g., of a museum, a historical site, or the like) could be conducted at least partially virtually. For instance, the tour could be conducted exclusively for the benefit of remote participants or for a combination of in-person participants and remote participants. The tour leader may walk around with a camera and provide commentary. Remote participants may be able to join the tour after the tour has begun, and still skip back to see anything that may have been missed. The tour leader (and potentially other participants) may be notified when remote participants join or leave the tour.

In another example, a trial lawyer may walk a jury through a virtual recreation of a crime scene while providing commentary. The trial lawyer may be able to jump the presentation of the virtual recreation backward or forward to specific events that the jury needs to see.

In another example, the present disclosure may allow different viewpoints of the same event (e.g., a live event or a virtual event) to be merged to create a single common narrative that pulls from the different viewpoints and/or synchronizes the experiences of the users associated with the multiple viewpoints. For instance, the event may be a concert. One "attendee" may be able to go back in the XR stream of the concert to watch the band perform his favorite song again. However, the attendee may still be able to talk, in real time, with his friend who is watching the song the band is currently playing or who has time shifted to watch a different song.

Moreover, although the personal XR environment described above is described as being used to ease transitions into and out of the XR experience, the personal XR environment could also be used to ease transitions related to time shifting. For instance, if a user has shifted backward in time for a significant period (e.g., more than x minutes), then attempts to jump ahead to the current time point, the personal XR environment could serve to ease the user's transition back to the current time point. In one example, easing the transition may comprise adjusting the speed with which the user moves ahead in the XR stream. For instance, the speed may gradually slow as the user's location in the XR stream approaches the current time point, so that the movement through the XR stream does not abruptly stop when the current time point is reached.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for presenting an XR experience with time shifting capabilities, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for presenting an XR experience with time shifting capabilities may include circuitry and/or logic for performing special purpose functions relating to the operation of a home gateway or AR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for presenting an XR experience with time shifting capabilities (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for presenting an XR experience with time shifting capabilities (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
presenting, by a processing system including at least one processor, an extended reality experience to a plurality of user devices, wherein the presenting includes presenting a time control along with an extended reality stream, wherein the extended reality stream comprises a dynamic stream that is recorded in real time as the extended reality experience progresses, wherein the time control comprises a control that, when manipulated by a user of any user device of the plurality of user devices, allows the any user device to move backward or forward through the extended reality stream on demand, and wherein the time control comprises a voice operable control;
receiving, by the processing system, a first signal from a first user device of the plurality of user devices via the time control, wherein the first signal indicates that a first user of the first user device wishes to shift the extended reality stream to a first point in time that is different from a time that is currently being rendered in the extended reality stream;
presenting, by the processing system, a personal extended reality environment to the first user device in response to the first signal, wherein the personal extended reality environment presents the first point in time in the extended reality stream to the first user device without changing a time point of the extended reality stream that is currently being presented to other user devices of the plurality of user devices; and
modifying, by the processing system, a representation of the first user in the extended reality stream as presented to the other user devices of the plurality of user devices to indicate that the first user device is not presenting the time that is currently being rendered in the extended reality stream.

2. The method of claim 1, wherein the time control is further presented as at least one of: a clock, a series of thumbnail images extracted from a series of corresponding time points in the extended reality stream, or a slider.

3. The method of claim 1, wherein the time control is further responsive to a user gesture.

4. The method of claim 1, wherein the extended reality stream is annotated with markers that indicate where notable events occurred in the extended reality stream.

5. The method of claim 4, wherein the first signal indicates a selection by the first user device of one of the markers.

6. The method of claim 1, wherein the modifying comprises visually altering an avatar of the representation of the first user in the extended reality stream that represents the first user of the first user device.

7. The method of claim 6, wherein the visually altering comprises at least one of: blurring the avatar, fading the avatar, graying out the avatar, or replacing the avatar with a placeholder.

8. The method of claim 1, wherein the modifying comprises presenting a voice of the representation of the first user of the first user device as a voiceover in the extended reality stream.

9. The method of claim 1, wherein the modifying comprises adding an audio effect to a voice of the representation of the first user of the first user device.

10. The method of claim 1, further comprising:
receiving, by the processing system after presenting the extended reality experience but prior to receiving the first signal, a second signal from the first user device, wherein the second signal indicates that the first user of first user device wishes to join the extended reality experience that is in progress; and
presenting, by the processing system, the personal extended reality environment to the first user device in response to the second signal, wherein the personal extended reality environment facilitates a transition of the first user of the first user device into the extended reality experience while the extended reality experience continues to be presented to the other user devices of the plurality of user devices.

11. The method of claim 10, wherein when the personal extended reality environment is presented in response to the second signal, the personal extended reality environment provides information about a portion of the extended reality experience that the first user of the first user device missed.

12. The method of claim 1, further comprising:
receiving, by the processing system after the first user device has joined the extended reality experience, a second signal from the first user device, wherein the second signal indicates that the first user of first user device wishes to exit the extended reality experience; and
presenting, by the processing system, the personal extended reality environment to the first user device in response to the second signal, wherein the personal extended reality environment facilitates a transition of the first user of the first user device out of the extended reality experience.

13. The method of claim 12, wherein when the second signal is received while the extended reality experience is still in progress, the processing system continues to present the extended reality experience to the other user devices of the plurality of user devices, concurrently with presenting the personal extended reality environment to the first user device.

14. The method of claim 1, wherein the first point in time is one of a plurality of points in time in the extended reality stream that are predefined with bookmarks in order to allow users of the plurality of user devices to revisit the plurality of points in time.

15. The method of claim 1, wherein the extended reality experience is at least one experience of: a multi-player video game, an immersive film presentation, a virtual tour, a virtual meeting, a training simulation, or a virtual recreation of a real world environment.

16. A non-transitory computer-readable medium storing instructions which, when executed by a processing system, cause the processing system to perform operations, the operations comprising:
presenting an extended reality experience to a plurality of user devices, wherein the presenting includes presenting a time control along with an extended reality stream, wherein the extended reality stream comprises a dynamic stream that is recorded in real time as the extended reality experience progresses, wherein the time control comprises a control that, when manipulated by a user of any user device of the plurality of user devices, allows the any user device to move backward or forward through the extended reality stream on demand, and wherein the time control comprises a voice operable control;

receiving a first signal from a first user device of the plurality of user devices via the time control, wherein the first signal indicates that a first user of the first user device wishes to shift the extended reality stream to a first point in time that is different from a time that is currently being rendered in the extended reality stream;

presenting a personal extended reality environment to the first user device in response to the first signal, wherein the personal extended reality environment presents the first point in time in the extended reality stream to the first user device without changing a time point of the extended reality stream that is currently being presented to other user devices of the plurality of user devices; and modifying a representation of the first user in the extended reality stream as presented to the other user devices of the plurality of user devices to indicate that the first user device is not presenting the time that is currently being rendered in the extended reality stream.

17. A device comprising:

a processor; and a computer-readable medium storing instructions which, when executed by the processor, cause the processor to perform operations, the operations comprising:

presenting an extended reality experience to a plurality of user devices, wherein the presenting includes presenting a time control along with an extended reality stream, wherein the extended reality stream comprises a dynamic stream that is recorded in real time as the extended reality experience progresses, wherein the time control comprises a control that, when manipulated by a user of any user device of the plurality of user devices, allows the any user device to move backward or forward through the extended reality stream on demand, and wherein the time control comprises a voice operable control;

receiving a first signal from a first user device of the plurality of user devices via the time control, wherein the first signal indicates that a first user of the first user device wishes to shift the extended reality stream to a first point in time that is different from a time that is currently being rendered in the extended reality stream;

presenting a personal extended reality environment to the first user device in response to the first signal, wherein the personal extended reality environment presents the first point in time in the extended reality stream to the first user device without changing a time point of the extended reality stream that is currently being presented to other user devices of the plurality of user devices; and modifying a representation of the first user in the extended reality stream as presented to the other user devices of the plurality of user devices to indicate that the first user device is not presenting the time that is currently being rendered in the extended reality stream.

18. The method of claim 4, wherein at least one marker of the markers designates a synchronization point for all user devices of the plurality of user devices.

19. The non-transitory computer-readable medium of claim 16, wherein the extended reality stream is annotated with markers that indicate where notable events occurred in the extended reality stream.

20. The non-transitory computer-readable medium of claim 19, wherein the first signal indicates a selection by the first user device of one of the markers.

* * * * *